(12) United States Patent
Arunachalam et al.

(10) Patent No.: US 6,411,653 B1
(45) Date of Patent: Jun. 25, 2002

(54) CASCADED POLYPHASE DFT-FILTER BAND FOR A WIRELESS TELECOMMUNICATIONS SYSTEM

(75) Inventors: Sridhar Arunachalam, Plainsboro; Reza Mardani, Flanders, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/356,261

(22) Filed: Jul. 16, 1999

(51) Int. Cl.[7] ............................................. H04B 7/12
(52) U.S. Cl. ............. 375/260; 375/240.02; 375/240.11; 375/240.18; 375/350; 348/395.1; 348/398.1; 348/404.1; 370/319; 370/335; 370/342; 370/465; 370/479
(58) Field of Search ........................ 375/219, 240.02, 375/240.11, 240.18, 146, 147, 259, 295, 316, 350, 260; 370/319, 335, 342, 465, 479; 455/103, 168.1; 348/395.1, 404.1, 398.1

(56) References Cited

U.S. PATENT DOCUMENTS

| | | | | |
|---|---|---|---|---|
| 5,323,391 A | * | 6/1994 | Harrison | 370/210 |
| 5,396,489 A | * | 3/1995 | Harrison | 370/210 |
| 5,535,240 A | * | 7/1996 | Carney et al. | 370/210 |
| 5,537,435 A | * | 7/1996 | Carney et al. | 370/210 |
| 5,606,575 A | * | 2/1997 | Williams | 370/484 |
| 6,005,900 A | * | 12/1999 | Zangi | 370/210 |

* cited by examiner

*Primary Examiner*—Chi Pham
*Assistant Examiner*—Khanh C Tran
(74) *Attorney, Agent, or Firm*—Wayne S. Breyer

(57) ABSTRACT

A technique for reducing computational and storage requirements of cascaded polyphase DFT-filter bank for receiving and transmitting telecommunications is disclosed. The cascaded polyphase DFT-filter bank is designed by specifically selecting a range of radio spectrum for reducing computational and storage requirements of the cascaded polyphase DFT-filter bank operation.

52 Claims, 12 Drawing Sheets

CASCADED POLYPHASE DFT-FILTER BANK FOR SOFTWARE-DEFINED RECEIVER

CASCADED POLYPHASE
DFT-FILTER BANK

CASCADED POLYPHASE DFT-FILTER BANK FOR SOFTWARE-DEFINED TRANSMITTER

CASCADED POLYPHASE DFT-FILTER BAND FOR A WIRELESS TELECOMMUNICATIONS SYSTEM

FIELD OF THE INVENTION

The present invention relates to telecommunications in general, and, more particularly, to a technique for using cascaded polyphase DFT-filter bank in software-defined radios to support wireless telecommunications.

BACKGROUND OF THE INVENTION

FIG. 1 depicts a schematic diagram of a portion of a typical wireless telecommunications system in the prior art, which system provides wireless telecommunications service to a number of wireless terminals (e.g., wireless terminals 101-1 through 101-4) that are situated within a geographic region. The heart of a typical wireless telecommunications system is Wireless Switching Center ("WSC") 120, which may also be known as a Mobile Switching Center ("MSC") or Mobile Telephone Switching Office ("MTSO"). Typically, Wireless Switching Center 120 is connected to a plurality of base stations (e.g., base stations 103-1 through 103-5) that are dispersed throughout the geographic area serviced by the system and to the local and long-distance telephone and data networks (e.g., local-office 130, local-office 138 and toll-office 140). Wireless Switching Center 120 is responsible for, among other things, establishing and maintaining calls between wireless terminals and between a wireless terminal and a wireline terminal (e.g., wireline terminal 150), which is connected to the system via the local and/or long-distance networks.

The geographic region serviced by a wireless telecommunications system is partitioned into a number of spatially distinct areas called "cells." As depicted in FIG. 1, each cell is schematically represented by a hexagon; in practice, however, each cell usually has an irregular shape that depends on the topography of the terrain serviced by the system. Typically, each cell contains a base station, which comprises the radios and antennas that the base station uses to communicate with the wireless terminals in that cell and also comprises the transmission equipment that the base station uses to communicate with Wireless Switching Center 120.

For example, when wireless terminal 101-1 desires to communicate with wireless terminal 101-2, wireless terminal 101-1 transmits the desired information to base station 103-1, which relays the information to Wireless Switching Center 120 over wireline 102-1. Upon receipt of the information, and with the knowledge that it is intended for wireless terminal 101-2, Wireless Switching Center 120 then returns the information back to base station 103-1 over wireline 102-1, which relays the information, via radio, to wireless terminal 101-2.

A base station will typically receive numerous communications from a number of wireless terminals that are located in the cell serviced by the base station. These numerous communications are received as an analog wide-band radio frequency (RF) signal at the base station. As used herein, the term "wide-band" refers to a band or range of radio spectrum that contains multiple narrow-bands. As used herein, the term "narrow-band" refers to a carrier band, which has a specified bandwidth for modulation and demodulation. Such carrier bands or specified bandwidths are specific to different communications standards. For example, a narrow-band is defined as 30 kHz for TDMA (IS-136), and a signal of 15 MHz would be a wide-band signal because it would have 500 narrow-bands for the TDMA system (500=15 MHz/30 kHz).

The analog wide-band RF signal is then typically separated by frequency into narrow-band channels at the base station. Individual communications contained in the narrow-band channels are then further processed within the telecommunications system.

One technique in the prior art for processing the analog wide-band RF signal is through the use of a software-defined receiver at the base station. In this prior art technique, the software-defined receiver will often contain, among other things, an analog-to-digital converter for converting an analog signal into a digital signal and a polyphase filter bank for separating the digital signal into narrow-band channels. Each narrow-band channel comprises a "pass-band" (representing a frequency band containing information associated with the narrow-band channel), a "stop-band" (representing a frequency band that does not contain such information) and a "transition-band" (representing a frequency band between the pass-band and the stop-band). The purpose of the polyphase filter bank is to organize information contained in the digital signal into appropriate "pass-bands" of the narrow-band channels.

A schematic diagram of a polyphase filter bank is shown in FIG. 2. The digital signal is divided into a number, M, of branches by decimating the digital signal on a time basis. Decimating a digital signal decreases the sampling rate of such signal typically through a process of filtering and downsampling. If a digital signal has a sampling rate of R, a decimator will decrease the sampling rate by a factor, D, to produce a new sampling rate of R/D. For example, when a signal has a sampling rate of 9 and is decimated by a factor of three, the decimator will form a new signal with a sampling rate of 3. In this example, a decimator performs integer decimation because the D factor is an integer. Fractional decimation is also possible and is typically achieved through a combination of decimation and interpolation, which will be described below.

Each branch contains a Finite Impulse Response Filter (FIR) through which the decimated digital signals are filtered. The decimated digital signals are stored in locations or "taps" within the FIR filters. The Crochiere and Rabiner equation provides the number, N, of FIR taps required for filtering such decimated digital signals.

[1]

$$N \cong \frac{D_\infty(\delta_p, \delta_s)}{\Delta F / F},$$

where:
- $\delta_p$ is the "ripple" or mean amplitude of the signal in the pass-band,
- $\delta_s$ is the "ripple" or mean amplitude of the signal in the stop-band,
- $D_\infty(\delta_p, \delta_s) = \log_{10}\delta_s * [0.005309 * (\log_{10}\delta_p)^2 + 0.07114 * \log_{10}\delta_p - 0.4761] - [0.00266 * (\log_{10}\delta_p)^2 + 0.5941 * \log_{10}\delta_p + 0.4278]$,
- "*" indicates multiplication,
- $\Delta F$ is the bandwidth of the transition-band in Hz, and
- $F$ is the sampling rate of a FIR filter in Hz.

The output digital signals from the FIR filters enter a Discrete Fourier Transform (DFT), such as a Fast Fourier Transform (FFT), where the separate digital signals are organized into M channels. Such an arrangement of FIR filters followed by a FFT transform is called a polyphase filter bank.

As illustrated in FIG. 3, the polyphase filter bank can be cascaded where polyphase filter banks are repeated for several stages, forming a cascaded polyphase DFT-filter bank, to transform a wide-band digital signal into a large number of narrow-band channels. A large number of narrow-band channels are not typically formed within a single polyphase filter because the size of that polyphase filter bank would become too large to effectively process the numerous communications.

Similarly, a polyphase filter bank or a cascaded polyphase DFT-filter bank can be used in a software-defined transmitter. As shown in FIG. 4, M narrow-band channels are combined into a single digital signal through use of an inverse Fast Fourier Transform (IFFT) or an inverse Discrete Fourier Transform (IDFT) methods and interpolating the digital signal on a time basis, in well-known fashion. Interpolating a digital signal increases the sampling rate of such signal typically through a process of upsampling and filtering. If a digital signal has a sampling rate of R, an interpolator will increase the sampling rate by a factor, L, to produce a new sampling rate of R*L. For example, when a signal has a sampling rate of 9 and is interpolated by a factor of three, the interpolator will form a new signal with a sampling rate of 27. In this example, the interpolator performs integer interpolation because the L factor is an integer. Fractional interpolation is also possible and is typically achieved through a combination of decimation and interpolation.

Operating requirement of a polyphase filter bank or a stage of a cascaded polyphase DFT-filter bank depends mainly upon computational rates performed within a polyphase filter bank and to a lesser degree upon storage requirements of a polyphase filter bank. As used herein, "operating requirement" refers to the computational rates of a polyphase filter bank or a cascaded polyphase DFT-filter bank. Such computational rates and storage requirements can be defined and minimized for a single polyphase filter or for each stage of a cascaded polyphase filter by well known Crochiere and Rabiner techniques. The computational rate, $R_T$, to be minimized is defined by

[2]

$$R_T = D_\infty(\delta_p/K, \delta_s) \sum_{i=1}^{K} \frac{F_{i-1} * F_i}{F_i - F_s - F_p},$$

where

K is the number of stages in the cascaded polyphase filter, s is the stop-band, p is the pass-band, $\delta_p$ is the "ripple" or mean amplitude of the signal in the pass-band, $\delta_s$ is the "ripple" or mean amplitude of the signal in the stop-band, i is a stage of the cascaded polyphase filter ($i \leq K$), F is frequency in Hz, and $D_\infty(\delta_p/K, \delta_s)$ is defined as in equation 1, except that $\delta_p$ is replaced with $\delta_p/K$.

The storage requirement, $N_T$, to be minimized is defined by

[3]

$$N_T = D_\infty(\delta_p/K, \delta_s) \sum_{i=1}^{K} \frac{F_{i-1}}{F_i - F_s - F_p},$$

where the terms are defined as in equation 2.

This prior art technique, however, does not investigate the cascading of a plurality of polyphase filters, nor does it examine the overall-operating requirement of a cascaded polyphase DFT-filter bank in terms of radio spectrum, which is used to receive or transmit communications. In other words, in the prior art, a stage of a cascaded polyphase DFT-filter bank has been optimized, but the input or output signals of a base station (e.g., the radio spectrum) have not been examined to reduce the operating requirement of a cascaded polyphase DFT-filter bank. Reducing the operating requirement of individual stages of a cascaded polyphase DFT-filter bank does not necessary result in an overall efficient cascaded polyphase DFT-filter bank because the nature of the cascading and the amount of radio spectrum enter into the overall operating requirements of a cascaded polyphase DFT-filter bank.

The art would benefit from a technique for reducing the operating requirement of a cascaded polyphase DFT-filter bank in a software-defined radio that considers overall computational requirements, cascading schemes and radio spectrum. Such a software-defined radio reduces costs associated with receiving and transmitting signals in a wireless telecommunications system.

SUMMARY OF THE INVENTION

In some embodiments, the present invention provides a telecommunications system that uses a cascaded polyphase DFT-filter bank having reduced computational requirements, as compared to the prior art, for receiving and transmitting communications. The computational requirements of the cascaded polyphase DFT-filter bank are reduced by specifically selecting a radio spectrum in which the number of channels in the radio spectrum can be factorized into small prime numbers.

In one embodiment of the present invention, the number of channels received at a base station are specifically selected with a goal of reducing computational requirements of the cascaded polyphase DFT-filter bank. The cascaded polyphase DFT-filter bank is then designed for this selected number of channels.

An illustrative method in accordance with the present teachings comprises the operations of:

selecting a first number, $M_A$, of narrow-band channels based on a nominal amount of spectrum (e.g. a 15 MHz analog wide-band signal) and a narrow-band bandwidth as dictated by communications system standards (e.g. ,30 KHz for TDMA (IS-136));

selecting a second number, $M_B$, of narrow-band channels, where $M_B \geq M_A$, wherein the second number, $M_B$, of narrow-band channels results in a minimum operating requirement for the cascaded polyphase DFT-filter bank over a range of narrow-band channels evaluated;

defining a second analog wide-band signal based on the second number, $M_B$, of narrow-band channels and the narrow-band bandwidth;

receiving the second analog wide-band signal at a base station; and converting the second analog wide-band signal into $M_B$ narrow-band channels.

DETAILED DESCRIPTION

The operating requirement of a cascaded polyphase DFT-filter bank depends mainly upon its computational rates. In accordance with the present teachings, the radio spectrum processed by a cascaded polyphase DFT-filter bank contained at a base station is specifically selected to reduce the operating requirement of the cascaded polyphase DFT-filter bank. The reduced operating requirement is achieved by specifically selecting a radio spectrum containing a number of narrow-band channels that can be factorized into small prime numbers. The cascade of the polyphase filter is then designed to reduce its computational and storage requirements for the selected radio spectrum.

Figure 1:
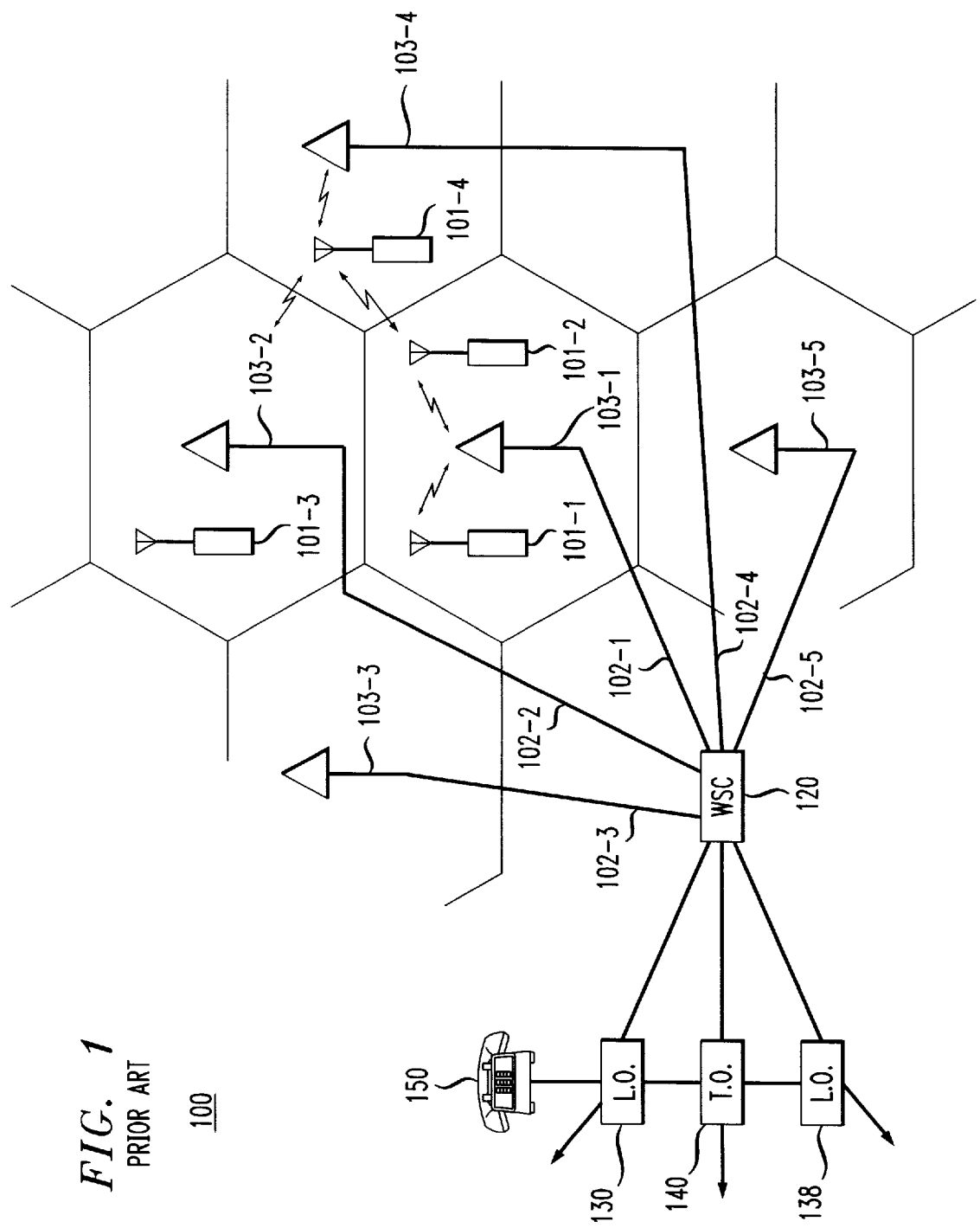
FIG. 1 depicts a schematic drawing of a wireless telecommunications system in the prior art.
Figure 2:
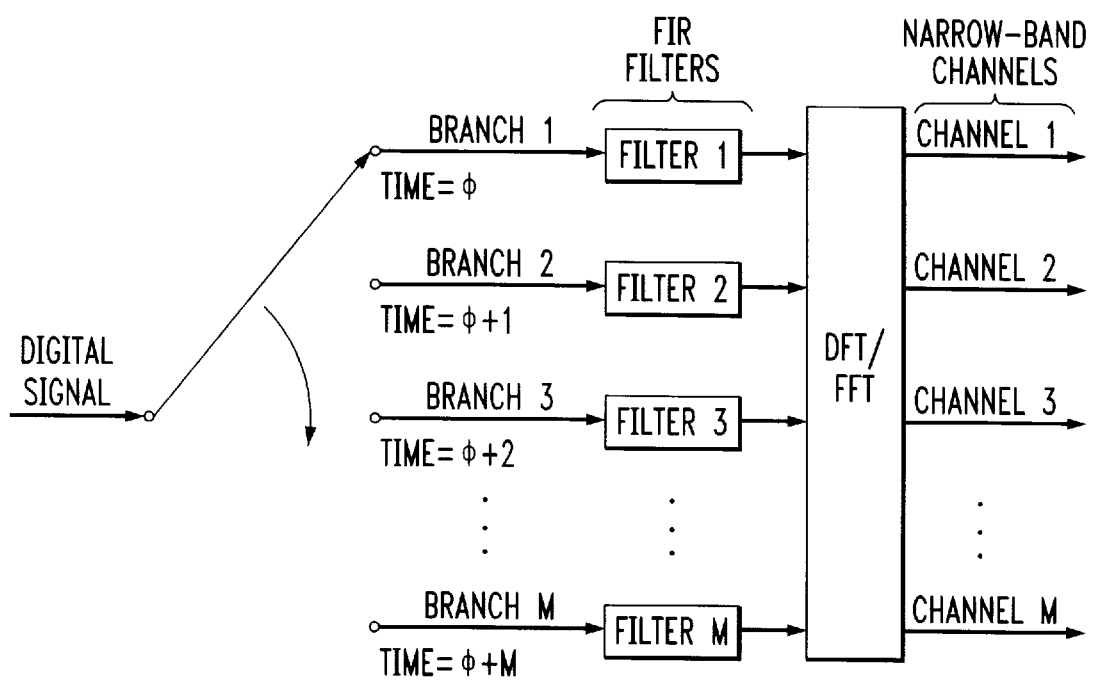
FIG. 2 depicts a schematic drawing of a polyphase filter for a software-defined receiver in the prior art.
Figure 3:
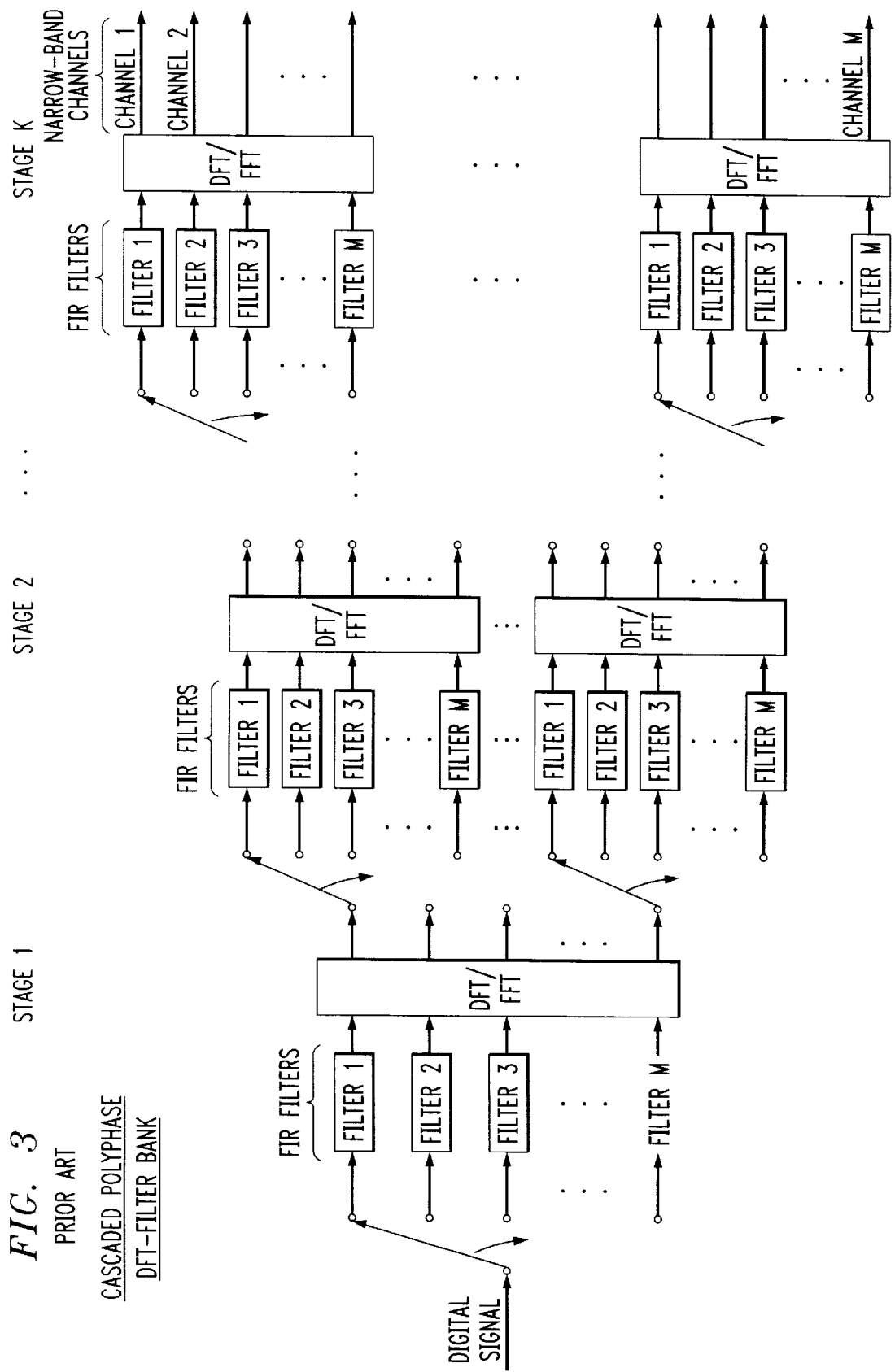
FIG. 3 depicts a schematic drawing of a cascaded polyphase DFT-filter bank in the prior art.
Figure 4:
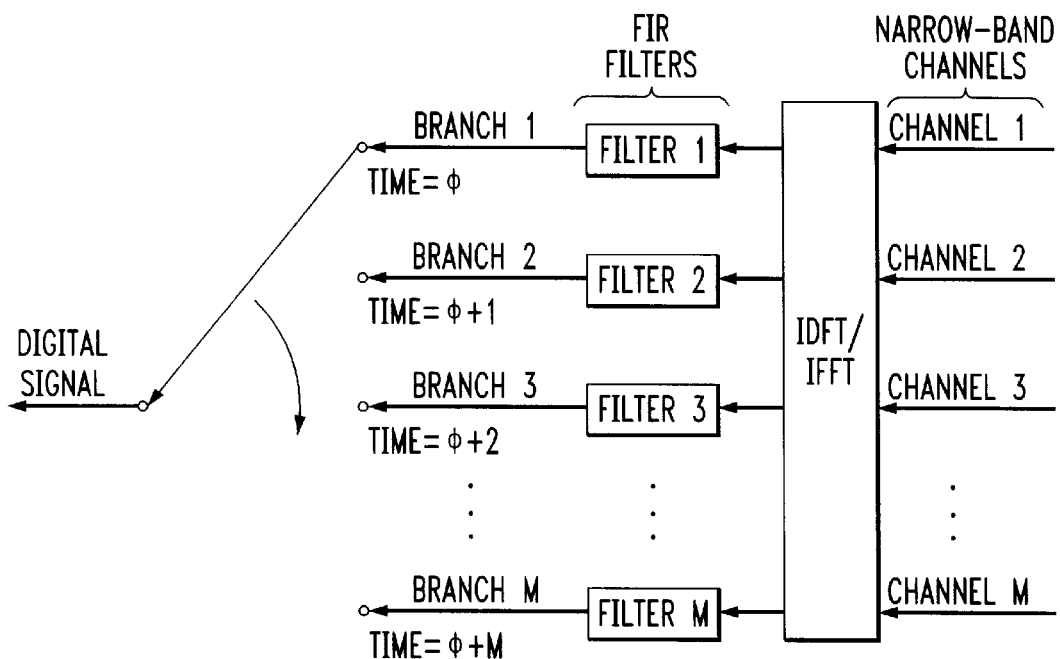
FIG. 4 depicts a schematic drawing of a polyphase filter for a software-defined transmitter in the prior art.
Figure 5:
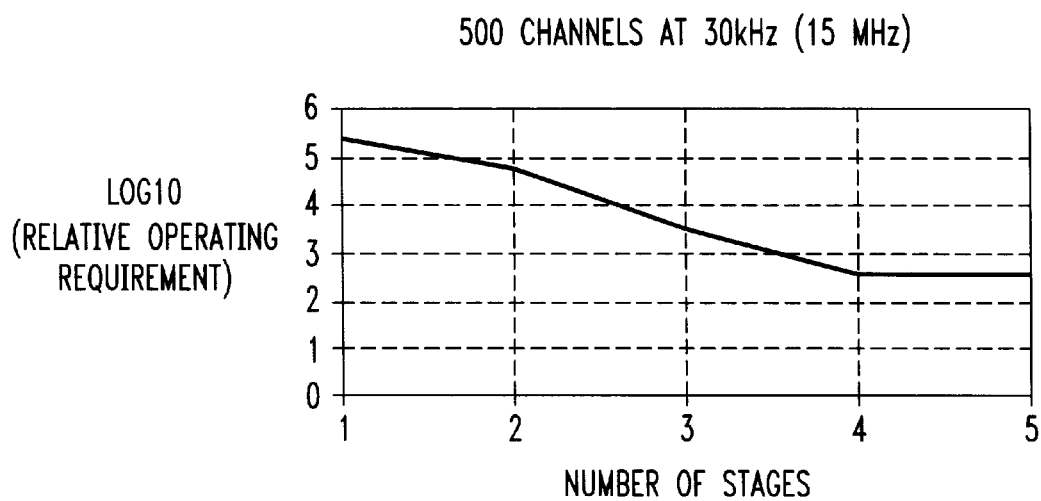
FIG. 5 depicts an illustration for reducing computational requirements of a cascaded polyphase DFT-filter bank by increasing a number of stages thereto.
Figure 6:
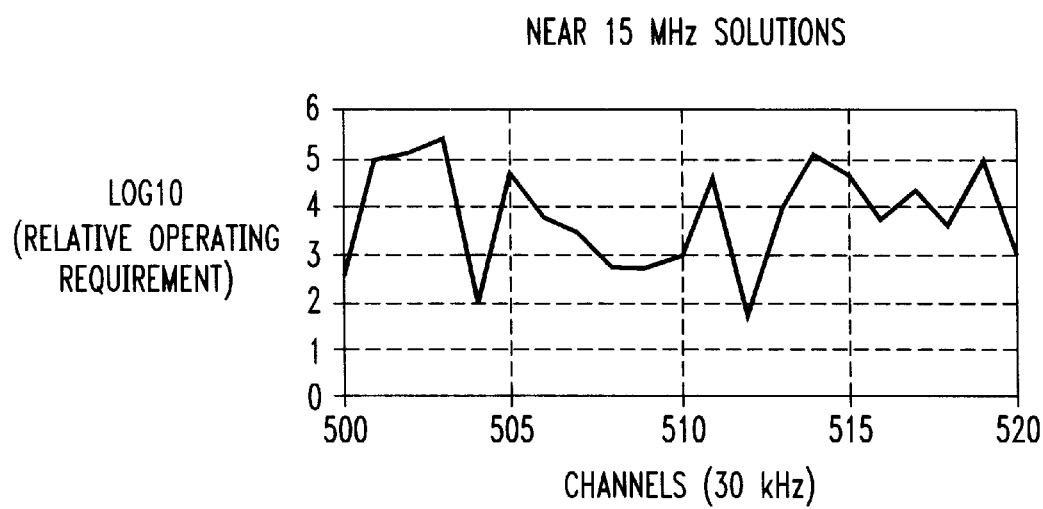
FIG. 6 depicts an illustration for reducing computational requirements of a cascaded polyphase DFT-filter bank by expanding the radio spectrum processed by the cascaded polyphase DFT-filter bank.

For example, consider that an operator of a telecommunications system desires to process a 15 MHz wide-band signal that has 500 narrow-band channels of 30 kHz bandwidth. As depicted in FIG. 5, an operating requirement of a polyphase filter bank for these 500 narrow-band channels is reduced as the polyphase filter bank is cascaded to a larger number of stages. There may exist, however, solutions with even lower operating requirements as the radio spectrum is also analyzed for the computational and storage requirements of the cascaded polyphase DFT-filter bank. The operator of a telecommunications system would not typically investigate a smaller radio spectrum because the entire 500 channels would not be processed, which often can result in a loss of information from the excluded channels. As depicted in FIG. 6, as the number of channels to be processed are increased (or the radio spectrum to be processed is extended beyond 15 MHz), polyphase filter banks with reduced operating requirements (e.g., at 504 and 512 channels) exist as compared to the operating requirement to process 500 channels.

The cascaded polyphase DFT-filter bank of the present invention is discussed below in conjunction with FIGS. 10 through 13. A base station, which uses the cascaded polyphase DFT-filter bank according to the present teachings, is first described in conjunction with FIGS. 7 through 9B to detail the functioning of the cascaded polyphase DFT-filter bank within the base station.

Figure 7:
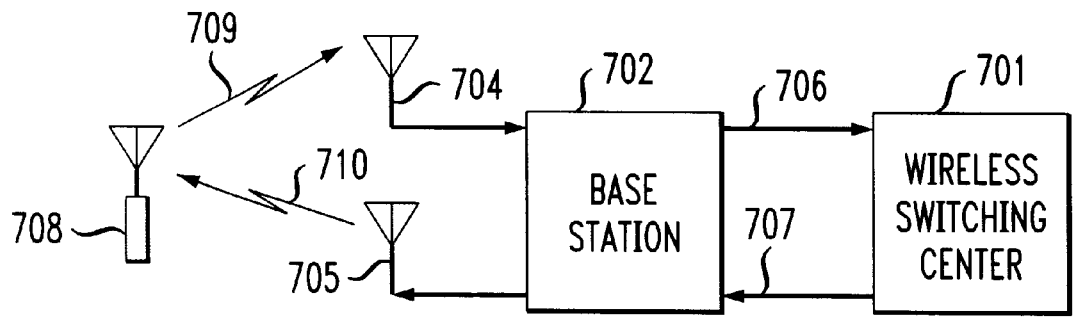
FIG. 7 depicts a schematic diagram of a portion of a wireless telecommunication system of the illustrative embodiment of the present invention.

FIG. 7 depicts a schematic diagram of a portion of a wireless telecommunications system in accordance with the illustrative embodiment of the present invention. The depicted portion includes wireless switching center 701, base station 702, wireless terminal 708, receive antenna 704 and transmit antenna 705, interrelated as shown. Communications received from wireless terminal 708 at receive antenna 704 are carried over a reverse or uplink channel. Communications transmitted to wireless terminal 708 from transmit antenna 705 are carried over a forward or downlink channel. Base station 702 avoids some of the disadvantages associated with prior art techniques by advantageously examining (1) the radio spectrum processed at a cascaded polyphase DFT-filter bank and (2) the cascade of the polyphase filter contained in the base station.

Figure 8:
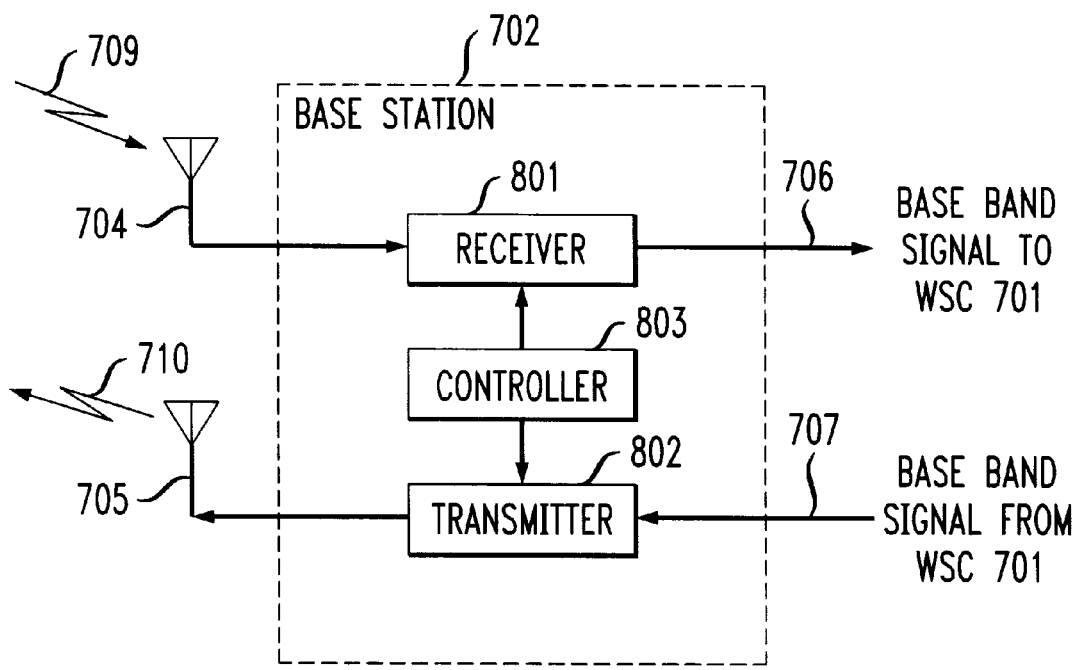
FIG. 8 depicts a schematic diagram of a portion of a base station of the illustrative embodiment of the present invention.

FIG. 8 depicts a schematic diagram of a portion of base station 702 in accordance with the present teachings. The depicted portion comprises receiver 801, transmitter 802 and controller 803, interrelated as shown. Controller 803 controls both receiver 801 and transmitter 802. In some embodiments one controller is used to control both receiver 801 and transmitter 802. In other embodiments separate controllers may suitably be used. Receiver 801 receives uplink analog wide-band RF signal 709 at receive antenna 704, in well-known fashion, and forwards base-band output to wireless switching center 701 via wireline 706. Transmitter 802 receives base-band signals from wireless switching center 701 via wireline 707 and transmits downlink analog wide-band RF signal 710 from transmit antenna 705, in well-known fashion. Receiver 801 and transmitter 802, which both contain, among other devices, a cascaded polyphase DFT-filter bank, are described in more detail below in conjunction with FIGS. 9A and 9B, respectively.

Figure 9A:
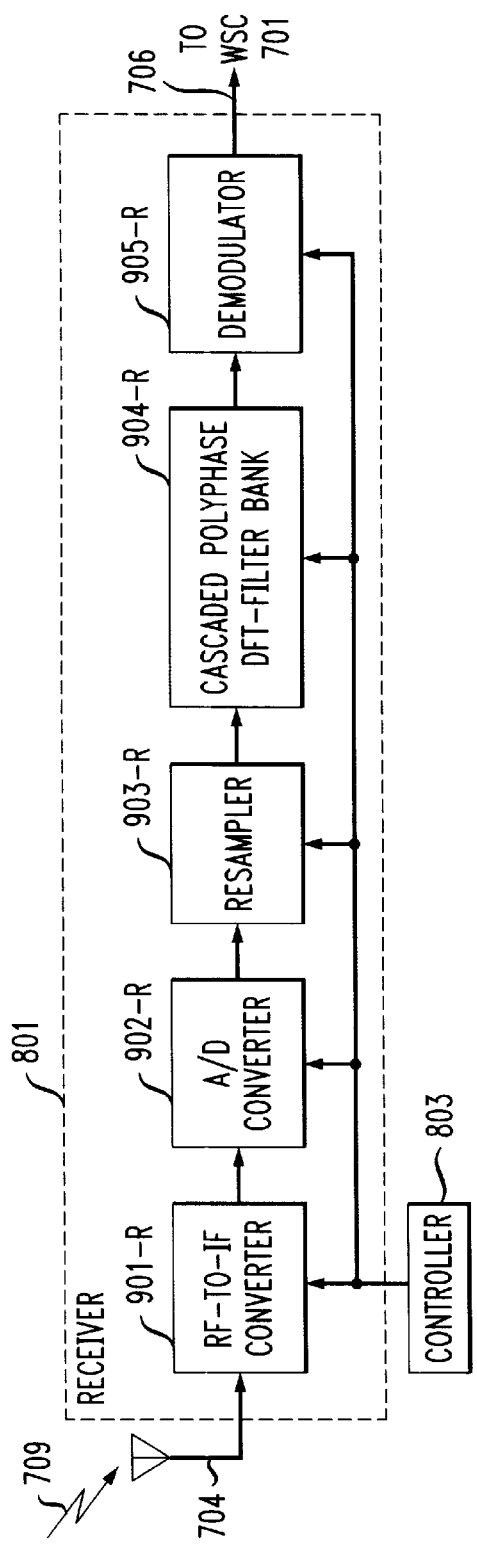
FIG. 9A depicts a schematic diagram of a portion of a receiving section of the base station of the illustrative embodiment of the present invention.

FIG. 9A depicts a schematic diagram of a portion of receiver 801 of the illustrative embodiment of the present invention, which comprises RF-to-IF converter 901-R, analog-to-digital converter 902-R, resampler 903-R, cascaded polyphase DFT-filter bank 904-R and demodulator 905-R, interrelated as shown. Receive antenna 704 receives uplink analog wide-band RF signal 709 and forwards it to RF-to-IF converter 901-R. RF-to-IF converter 901-R contains filters, mixers and amplifiers for converting the analog wide-band RF signal to an intermediate frequency (IF) uplink analog wide-band signal, where the intermediate frequency (IF) typically is lower than the radio frequency (RF). The aforementioned receive and conversion operations are well known in the art.

The uplink analog wide-band IF signal is converted into an IF uplink digital signal at analog-to-digital converter 902-R. Controller 803 typically directs analog-to-digital converter 902-R to convert the signal at a sampling rate based on a maximum rated capacity of analog-to-digital converter 902-R.

Resampler 903-R provides flexibility to alter the sampling rate in the digital signals in preparation for further signal processing at cascaded polyphase DFT-filter bank 904-R, which converts the digital signal into narrow-band channels. The sampling rate may have to be altered to avoid losing signal information from the digital signal as it is converted into narrow-band channels. One technique for avoiding such signal information loss is to maintain a sampling rate in each narrow-band channel above the Nyquist rate, in well-known fashion. Another technique for controlling resampling rates is taught in commonly assigned, co-pending U.S. patent application Ser. No. 09/115,933, filed Jul. 15, 1998, and entitled "Software-Defined Transceiver for a Wireless Telecommunications System," which application is incorporated by reference herein.

The digital signal is converted into narrow-band channels at cascaded polyphase DFT-filter bank 904-R. Design of cascaded polyphase DFT-filter bank 904-R will be described later in this Specification (see description accompanying FIG. 10). Demodulator 905-R demodulates the narrow-band channels and forwards them to wireless switching center 701 for additional processing. The present invention is not limited to any particular type of demodulation (e.g., amplitude demodulation, frequency demodulation or phase demodulation). Controller 803 controls the design, implementation and operation of cascaded polyphase DFT-filter bank 904-R and controls demodulator 905-R.

Figure 9B:
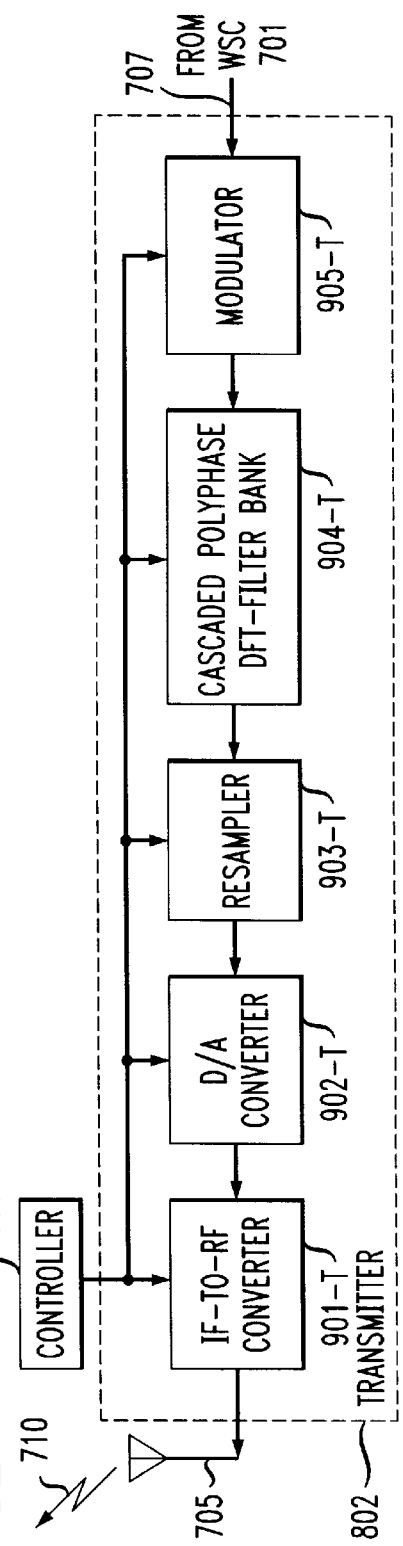
FIG. 9B depicts a schematic diagram of a portion of a transmitting section of the base station of the illustrative embodiment of the present invention.

FIG. 9B depicts a schematic diagram of a portion of transmitter 802 of the illustrative embodiment of the present invention, which comprises IF-to-RF converter 901-T, digital-to-analog converter 902-T, resampler 903-T, cascaded polyphase DFT-filter bank 904-T and modulator 905-T, interrelated at shown. Modulator 905-T receives base-band signals from wireless switching center 701 via wireline 707, in well-known fashion. Each base-band signal represents a narrow-band channel. The present invention is not limited to any particular type of modulation (e.g., amplitude modulation, frequency modulation or phase modulation).

Cascaded polyphase DFT-filter bank 904-T converts the base-band signals into an IF downlink digital signal. The design of cascaded polyphase DFT-filter bank 904-T will be described below in conjunction with FIG. 10.

Resampler 903-T provides flexibility to alter the sampling rate in the IF downlink digital signal in preparation for converting the IF downlink digital signal into a downlink analog wide-band IF signal, which conversion is performed at digital-to-analog converter 902-T. Controller 803 may direct resampler 903-T to alter the sampling rate to avoid the loss of signal information through previously described techniques, in well-known fashion.

Controller 803 typically directs digital-to-analog converter 902-T to convert the IF downlink digital signal to a downlink analog wide-band IF signal at a maximum rate based on rated capacity of digital-to-analog converter 902-T. IF-to-RF converter 901-T converts the downlink analog wide-band IF signal into a downlink analog wide-band RF signal. Transmit antenna 705 receives the downlink analog wide-band RF signal and transmits downlink analog wide-band signal 710. The aforementioned conversion and transmission operations are well known in the art.

Figure 10:
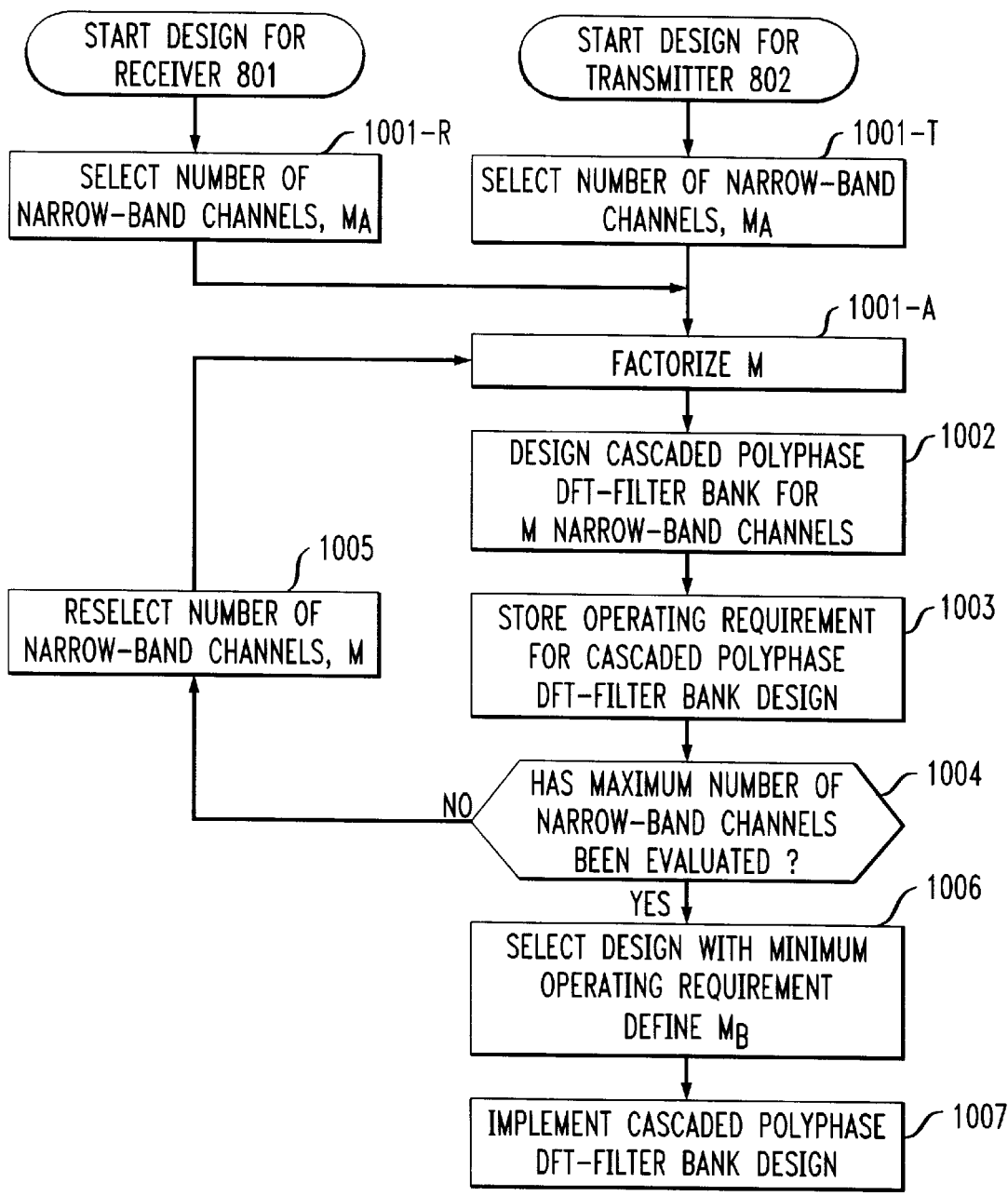
FIG. 10 depicts a flowchart of controller operations for implementing a cascaded polyphase DFT-filter bank for receiving and transmitting sections of the base station of the illustrative embodiment of the present invention.

FIG. 10 depicts a flowchart for the design of cascaded polyphase DFT-filter bank 904-R and 904-T. The design of cascaded polyphase DFT-filter bank 904-R for receiver 801 begins at step 1001-R, and the design of cascaded polyphase DFT-filter bank 904-T for transmitter 802 begins at step 1001-T.

At step 1001-R, controller 803 selects a number, $M_A$, of narrow-band channels into which the digital signal is to be processed. Details of step 1001-R will be described below in conjunction with FIG. 11A.

At step 1001-T, controller 803 selects a number, $M_A$, of narrow-band channels for generating digital signals. Details of step 1001-T will be described below in conjunction with FIG. 11B.

Figure 12:
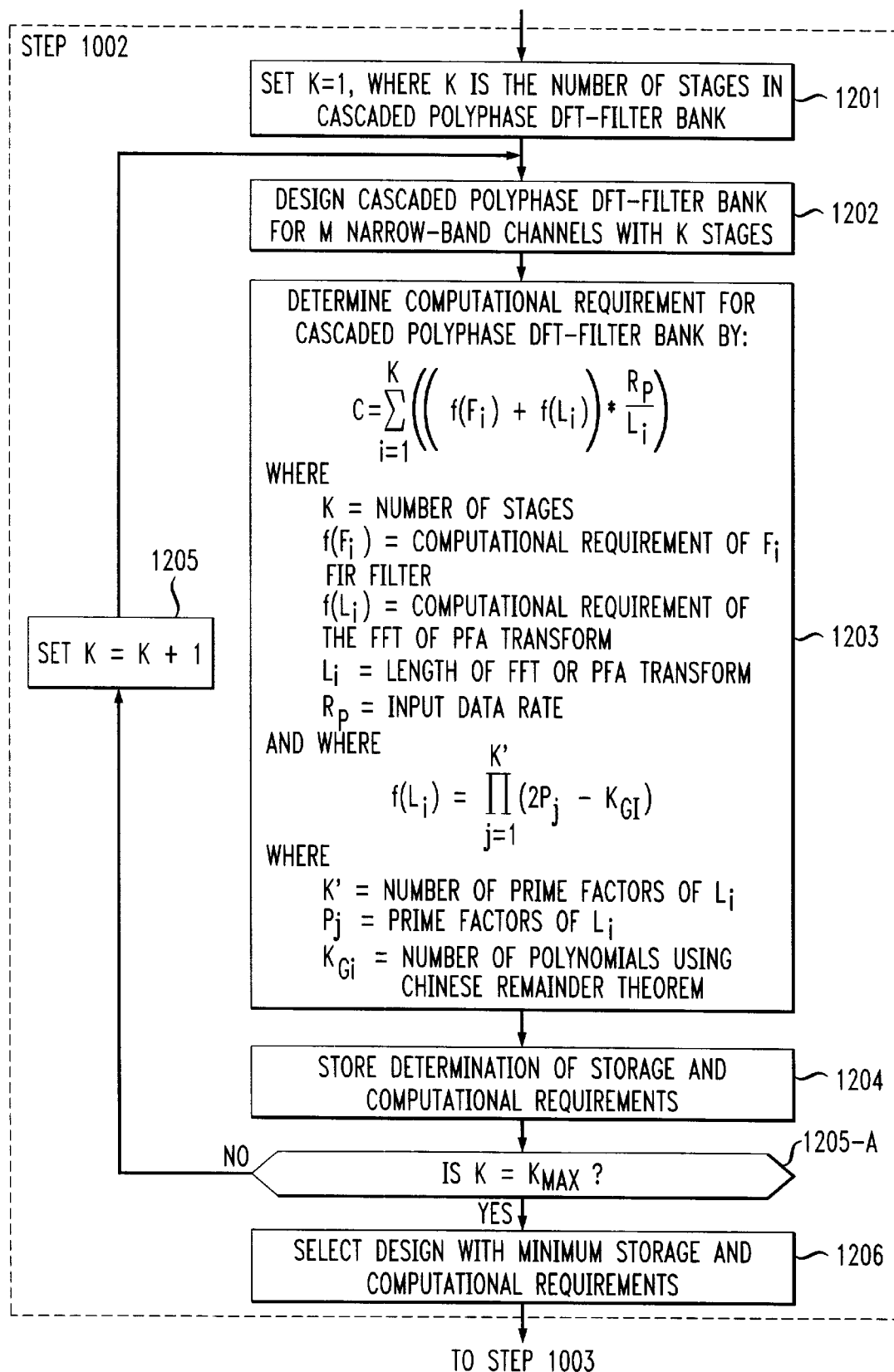
FIG. 12 depicts a flowchart of controller operations for designing the stages of the cascaded polyphase DFT-filter bank for receiving and transmitting sections of the base station of the illustrative embodiment of the present invention.

At step 1002, cascaded polyphase DFT-filter bank 904-R or 904-T is designed for the M narrow-band channels. Details of step 1002, which will be described below, are depicted in FIG. 12.

At step 1003, a computational and storage requirement of cascaded polyphase DFT-filter bank 904-R or 904-T is calculated by controller 803 and stored in memory accessible thereto, in well-known fashion.

At step 1004, controller 803 determines when a maximum number of narrow-band channels has been evaluated for the design of cascaded polyphase DFT-filter bank 904-R or 904-T. The maximum number of narrow-band channels is set at step 1104-R (FIG. 11A) for receiver 801 and at step 1104-T (FIG. 11B) for transmitter 802. Steps 1104-R and 1104T are described later in this Specification.

When the maximum number of narrow-band channels has not been evaluated, then at step 1005 controller 803 reselects a number of narrow-band channels by proceeding to step 1107, which will be described in conjunction with FIG. 11C.

When the maximum number of narrow-band channels has been evaluated, then at step 1006 controller 803 selects the design with a minimum operational requirement from the data stored in accessible memory at step 1004. The number of narrow-band channels of the selected design defines $M_B$. Having selected $M_B$, a second analog wide-band signal is defined by a bandwidth $W_{IF2}$, given by:

$$W_{IF2} = M_B * W,$$

where W is the channel bandwidth of the narrow band channels.

At step 1007, controller 803 implements the design with the minimum operating requirement as cascaded polyphase DFT-filter bank 904-R or 904-T.

Figure 11A:
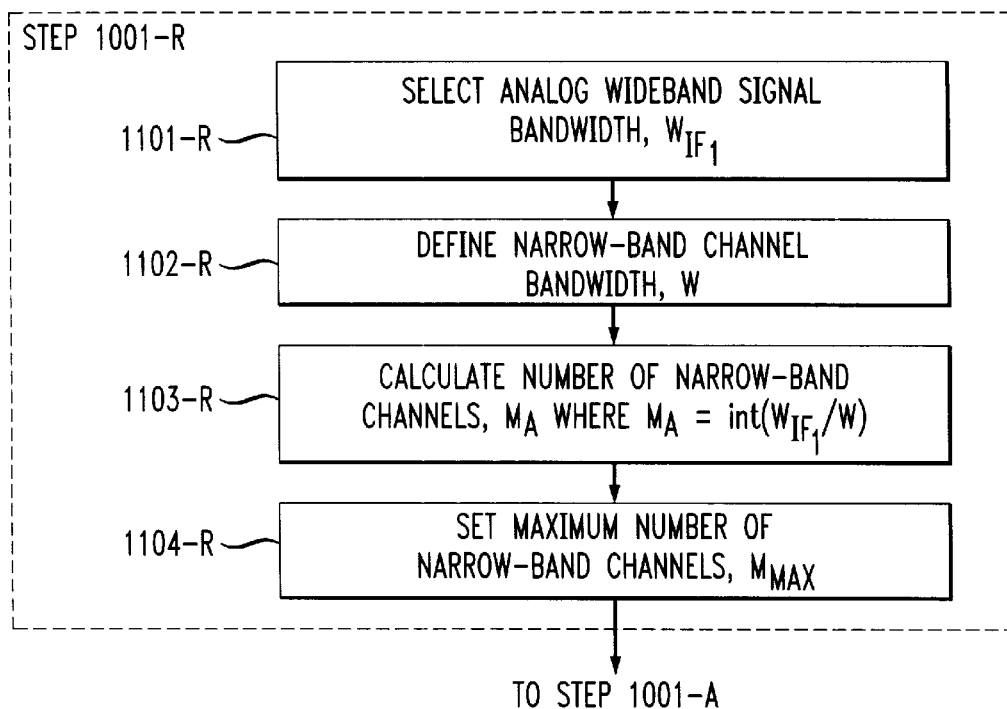
FIG. 11A depicts a flowchart of controller operations for selecting narrow-band channels for the receiving section of the base station of the illustrative embodiment of the present invention.

FIG. 11A depicts a flowchart of the details of step 1001-R for selecting the number of narrow-band channels for receiver 801 of the illustrative embodiment of the present invention.

At step 1101-R, controller 803 selects a bandwidth, $W_{IF1}$, of uplink analog wide-band RF signal 706. Bandwidth $W_{IF1}$ is determined from the Nyquist rate, the required bandwidth and the number $M_A$, of narrow band uplink channels. As is well known, the Nyquist rate is the sampling rate at which an analog signal must be sampled to digitally represent information contained in such analog signal. The Nyquist rate is twice the bandwidth of the subject analog signal.

At step 1102-R, controller 803 defines a bandwidth, W, of the narrow-band uplink channels. The bandwidth is typically determined from the system requirements of the wireless telecommunications system, in well-known fashion. For example, in a typical TDMA system, the required bandwidth is set at 30 kHz.

At step 1103-R, controller 803 determines a number of narrow-band channels by dividing the bandwidth, $W_{IF}$, of uplink analog wide-band RF signal 709 by the bandwidth, W, of the narrow-band uplink channels. This calculation result is truncated to yield an integer number, $M_A$, of narrow-band channels.

At step 1104-R, a maximum number, $M_{MAX}$, of narrow-band channels is set. This maximum number is typically set at 105 percent of the number of narrow-band channels determined in step 1103-R. Other maximum limits on the number of narrow-band channels may suitably be used. Having completed processing at block 1001-R, processing continues at operation 1001-A, the details of which are depicted in FIG. 11C.

In step 1105-A, the number of narrow-band channels, M, is set equal to $M_A$. At step 1105, M is factorized into prime numbers, $M_i$, where $M=M_1^{X_1} * M_2^{X_2} \ldots * M_{i-1}^{X_{i-1}} * M_i^{X_i}$. The numbers $X_1, X_2 \ldots X_{i-1}$ and $X_i$ and $M_1, M_2, \ldots M_{i-1}$ and $M_i$ are positive integers greater than zero, where $M_1<M_2 \ldots <M_{i-1}<M_i$.

At step 1106, controller 803 compares $M_i$ to a maximum prime number, $M_{TARGET}$, where $M_{TARGET}$ is advantageously set equal to 7 to reduce computational requirements of cascaded polyphase DFT-filter bank 904-R. The present invention is not limited to the use of 7 as a maximum prime number, and other higher prime numbers may suitably be used. Higher prime numbers, however, increase computational requirements.

When $M_i$ is greater than $M_{TARGET}$, then, at step 1107, M is set to M+1. The M+1 value is then returned to step 1105. Also, at step 1107, controller 803 reselects the number of narrow-band channels from step 1005 by setting M equal to M+1.

When $M_i$ is less or equal to $M_{TARGET}$, then, at step 1108-A, $K_{MAX}$, which is the maximum number of stages for the polyphase filter bank, is set equal to the summation of $X_j$ where j=1 to i. At step 1108, controller 803 sets M as the number of narrow-band channels for the design of the cascaded polyphase DFT-filter bank in step 1002. Before describing details of step 1002, the selection of narrow-band channels for transmitter 802 will be described below.

Figure 11B:
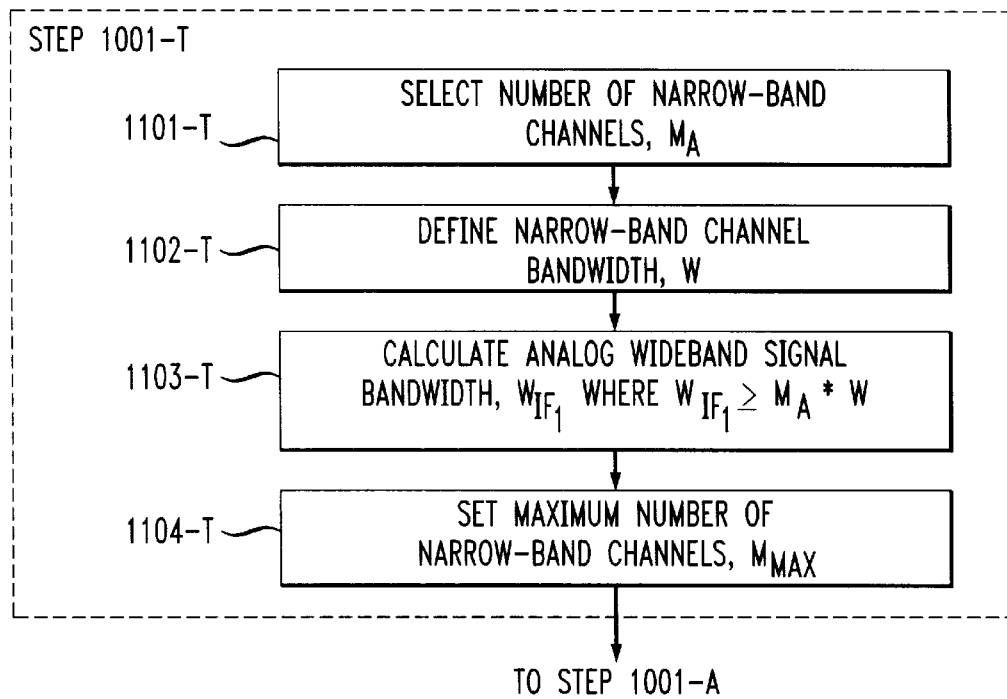
FIG. 11B depicts a flowchart of controller operations for selecting narrow-band channels for the transmitting section of the base station of the illustrative embodiment of the present invention.
Figure 11C:
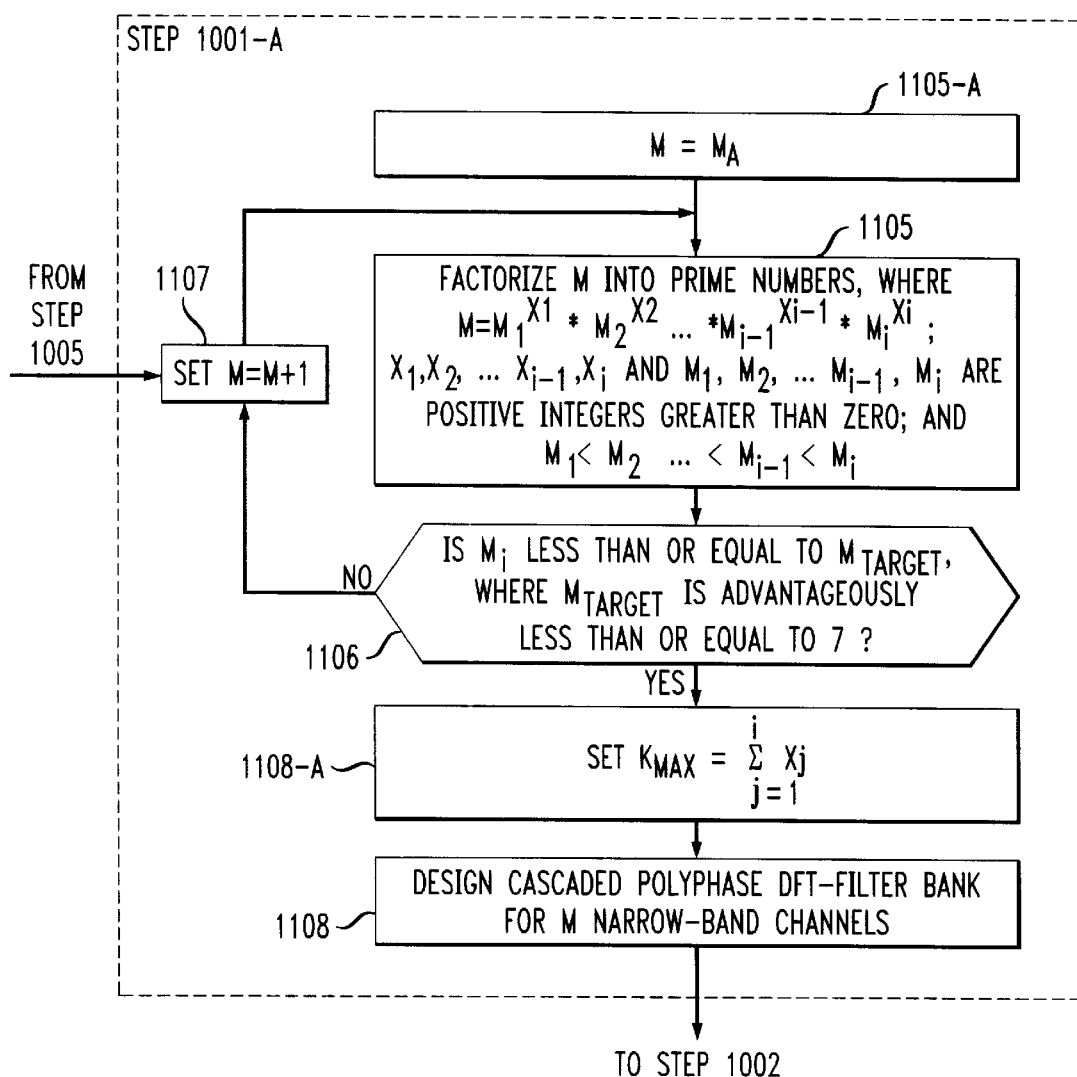
FIG. 11C depicts a flowchart of controller operations for factorizing the number of narrow-band channels into prime numbers.

FIG. 11B depicts a flowchart of the details of step 1001-T for selecting the number of narrow-band channels for transmitter 802 of the illustrative embodiment of the present invention.

At step 1101-T, controller 803 selects a number, $M_A$, of narrow-band channels. The number, $M_A$, of narrow-band channels is determined from telecommunications system requirements for downlink analog wide-band RF signal 710, in well-known fashion. For example, a telecommunications system may be authorized to utilize 500 channels to support its system. An operator of such a telecommunications system would direct controller 803 to select the 500 channels (i.e., $M_A$=500).

At step 1102-T, controller 803 defines a bandwidth, W, of the narrow-band downlink channels. The bandwidth is typically determined from the system requirements of the wireless telecommunications system, in well-known fashion. For example, in a typical TDMA system the required bandwidth is set at 30 kHz.

At step 1103-T, controller 803 determines a bandwidth, $W_{IF1}$, encompassing the $M_A$ narrow-band channels, where $W_{IF1} \geq M_A * W$.

At step 1104-T, a maximum number, $M_{MAX}$, of narrow-band channels is set. This maximum number is typically set at 105 percent of the number of narrow-band channels selected in step 1101-T. Other maximum limits on the numbers of narrow-band channels may suitably be used.

At step 1105-A, the number of narrow-band channels, M, is set equal to $M_A$.

At step 1105, the number of narrow-band channels, M, is factorized into prime numbers, $M_i$, where $M=M_1^{X_1} * M_2^{X_2} \ldots * M_{i-1}^{X_{i-1}} * M_i^{X_i}$. The numbers $X_1, X_2, \ldots X_{i-1}$ and $X_i$ and $M_1, M_2, \ldots M_{i-1}$ and $M_i$ are positive integers greater than zero, where $M_1<M_2 \ldots <M_{i-1}<M_i$.

At step 1106, controller 803 compares $M_i$ to a maximum prime number, $M_{TARGET}$, where $M_{TARGET}$ is advantageously set equal to 7 to reduce the computational requirements of cascaded polyphase DFT-filter bank 904-T. The present invention is not limited to the use of 7 as a maximum prime number, and other higher prime numbers may suitably be used. Higher prime numbers, however, will increase the computational and storage requirements.

When $M_i$ is greater than $M_{TARGET}$, then, at step 1107, M is set to M+1. The M+1 value is then returned to step 1105. Also at step 1107, controller 803 reselects the number of narrow-band channels for step 1005 by setting M equal to M+1.

When $M_i$ is less or equal to $M_{TARGET}$, then, at step 1108-A, $K_{MAX}$, which is the maximum number of stages for the polyphase filter bank, is set equal to the summation of $X_j$ where j=1 to i. At step 1108, controller 803 sets M as the number of narrow-band channels for the design of the cascaded polyphase DFT-filter bank in step 1002.

Returning to step 1002, cascaded polyphase DFT-filter bank 904-R and 904-T are designed for M narrow-band channels. Details for designing cascaded polyphase DFT-filter bank 904-R and 904-T are described below in conjunction with FIG. 12.

At step 1201 of FIG. 12, controller 803 sets a number, K, of stages for the polyphase filter bank to one.

At step 1202, controller 803 designs the polyphase filters with K stages for the M narrow-band channels. Details of this step are described below in conjunction with FIG. 13, which is a flowchart for the operation of the design of a polyphase filter.

Figure 13:
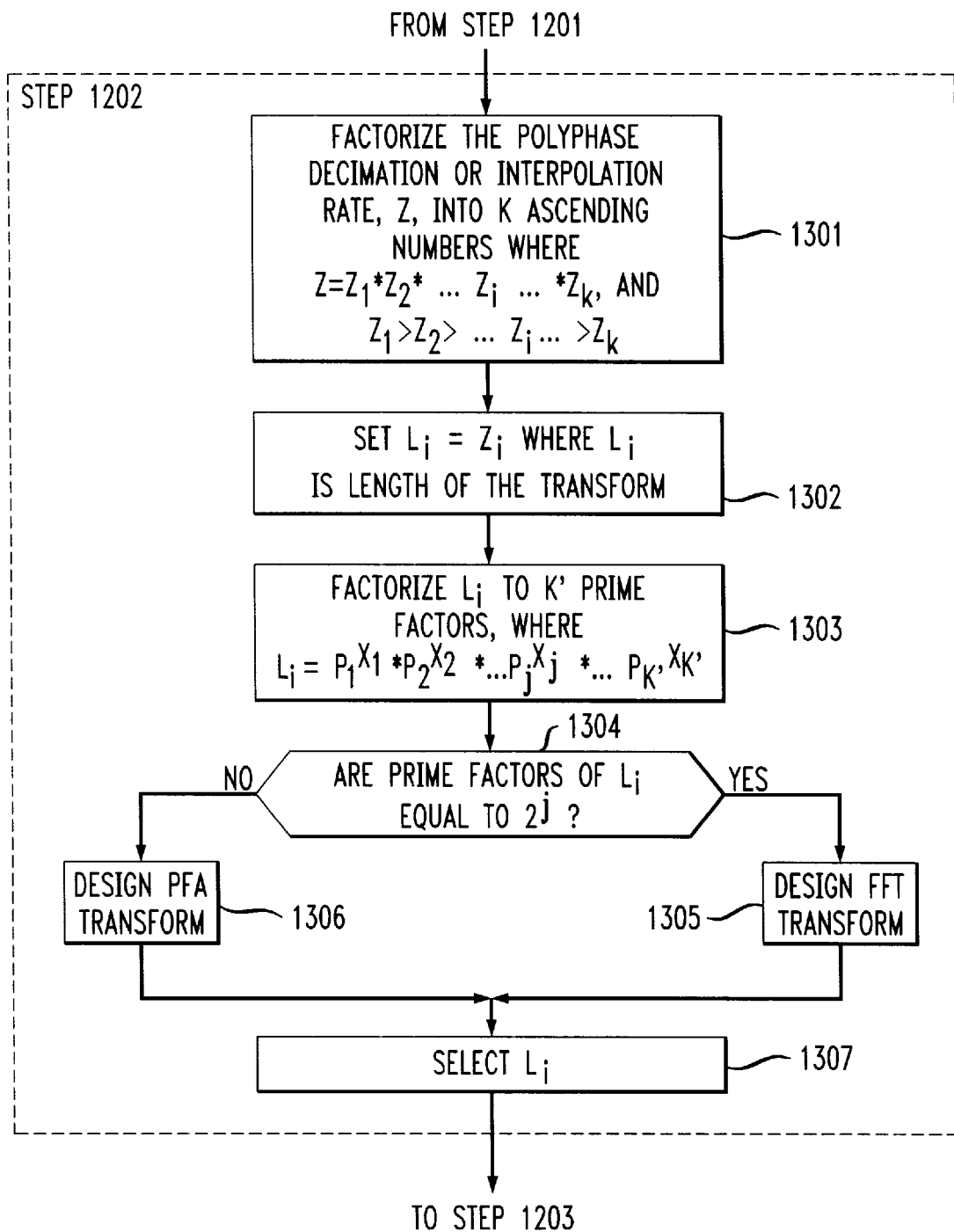
FIG. 13 depicts a flowchart of controller operations for designing a stage of the cascaded polyphase DFT-filter bank for receiving and transmitting sections of the base station of the illustrative embodiment of the present invention.

At step 1301 of FIG. 13, the polyphase decimation or interpolation rate, Z, is factorized into K numbers, where $Z=Z_1 * Z_2 \ldots Z_i \ldots * Z_K$ and $Z_1>Z_2> \ldots Z_i \ldots >Z_K$. The Z decimation rate will be used in design of the polyphase filter for receiver 801. The Z interpolation rate will be used in the design of a polyphase filter for transmitter 802, which will be described below. The $Z_k$ rate is determined from the number of narrow-band channels that a $K^{th}$ stage will process, in well-known fashion. For example, if there are 15 (M=15) narrow-band channels and one stage to the polyphase filter, then the decimation (or interpolation) rate will be 15. If there are again 15 (M=15) narrow-band channels and two stages to the polyphase filter, then the first stage decimation (or interpolation) rate will be 5 and the second stage decimation (or interpolation) rate will be 3. Typically, an initial stage of a cascaded polyphase DFT-filter bank will often have a higher decimation (or interpolation) rate as compared to the terminal stage because the higher initial decimation (or interpolation) rate reduces the overall operating requirements of the cascaded polyphase DFT-filter bank.

At step 1302, length, $L_i$, of a Fast Fourier Transform (FFT) or a Prime Factor FFT (PFA) is set equal to the $Z_i$ rate. A PFA is a type of FFT that uses prime factors.

At step 1303, the $L_i$ length is factorized into its prime numbers.

At step 1304, controller 803 determines if the only prime factor of $L_i$ is 2, where $L_i = 2^j$.

At step 1305, an FFT is designed when the prime factors of $L_i$ are equal to $2^j$, in well-known fashion.

At step 1306, a PFA is designed when the prime factors of $L_i$ are not equal to $2^j$, in well-known fashion. At step 1307, controller stores $L_i$.

Returning to step 1203 of FIG. 12, the computational requirement, C, of the cascaded polyphase DFT-filter bank is determined by controller 803 from

[4]

$$C = \sum_{i=1}^{K} \left( (f(F_i) + f(L_i)) * \frac{R_p}{L_i} \right),$$

where:

K is the number of stages in the polyphase filter, $f(F_i)$ is the computational requirement of $F_i$ FIR filter (addresssed below), $f(L_i)$ is the computational requirement of the FFT of PFA (addressed below), $L_i$ is the length of the FFT or PFA, and $R_p$ is the data rate, in samples per second, of the digital signal processed at the input of the cascaded polyphase DFT-filter bank.

The operating requirement of the $F_i$ FIR filter is a function of the digital data rate and the number of taps to be computed in the $F_i$ FIR filter, which is represented by the term of $$f(F_i) * \frac{R_p}{L_i}.$$

The computational requirement of $f(F_i)$ of the $F_i$ FIR filter is readily determined by one skilled in the art. The operating requirement of the FFT or PFA method is a function of the digital data rate and the number of computations performed in the method, which is represented by the term of $$f(L_i) * \frac{R_p}{L_i}.$$

The computations performed at such $F_i$ FIR filters and FFT or PFA methods consist of both multiplications and additions. Computational requirements of the FFT or PFA methods, however, depend mainly upon the multiplications because such multiplications are more intensive than additions.

When $M_{TARGET}$ is set equal to or less than 7 at step 1106, short length transforms are used for the FFT or PFA methods. The computational requirement for the multiplications of such short-length transforms is a function of the digital data rate and the number of multiplications performed in the method, which is represented by the term of

[5]

$$f(L_i) = (2P_j - K_{Gi}) * \frac{R_p}{L_i}.$$

The computational requirement, C, of the cascaded polyphase DFT-filter bank for the multiplications with such short-length transforms is determined from

[6]

$$C = \sum_{i=1}^{K} \left( \left( f(F_i) + \prod_{j=1}^{K'} (2P_j - K_{Gi}) \right) * \frac{R_p}{L_i} \right),$$

where:

K is the number of stages in the polyphase filter, $f(F_i)$ is the multiplication requirement of $F_i$ FIR filter, $L_i$ is the length of the FFT or PFA, K' is the number of prime factors of $L_i$, $P_j$ are the prime factors of $L_i$, $K_{Gi}$ is determined using the Chinese Remainder Theorem for polynomials, and $R_p$ is the data rate of the digital signal processed at the input of the cascaded polyphase DFT-filter bank.

The term $$\prod_{j=1}^{K'} (2P_j - K_{Gi})$$

represents the minimum number of computations necessary to compute the FFT or PFA in terms of equivalent circular convolution. Circular convolution is a fast method to perform the PFA or FFT. The process of changing the PFA or FFT into a circular convolution involves mapping of indices. This mapping is used to change multiplication of indices of modulo N to additions of indices N−1, in well-know fashion. The number of factors used in the Chinese Remainder Theorem for polynomials is represented by the term, $K_{Gi}$. For example, if the PFA or FFT is processing sequence of computations with a transform length of 5, then the Chinese Remainder Theorem states that $Z^5 - 1 = (Z-1)*(Z^4+Z^3+Z+1)$. In this example, $K_{Gi}$ would be 2 because there are two factors on the right-hand side of the equation. Additional values of $K_{Gi}$ for various transform lengths are given below in Table 1. It will be clear to those skilled in the art how to determine the number of factors, $K_{Gi}$, from the Chinese Remainder Theorem for other values.

TABLE 1

| Transform Length | Chinese Remainder Theorem | $K_{Gi}$ |
|---|---|---|
| 3 | $Z^3 - 1 = (Z - 1)*(Z^2 + Z + 1)$ | 2 |
| 4 | $Z^4 - 1 = (Z - 1)*(Z + 1)*(Z^2 + 1)$ | 3 |
| 5 | $Z^5 - 1 = (Z - 1)*(Z^4 + Z^3 + Z + 1)$ | 2 |
| 6 | $Z^6 - 1 = (Z - 1)*(Z + 1)*(Z^2 + Z + 1)*(Z^2 - Z + 1)$ | 5 |

At step 1204, the computational and storage requirement, C, for the cascaded polyphase DFT-filter bank is stored.

At step 1205-A, if $K=K_{max}$, then, at step 1206, the design with a minimum computational and storage requirement for the cascaded polyphase DFT-filter bank is selected. As the number of stages increase, the operating requirement of the cascaded polyphase DFT-filter bank may initially decline. At some point increasing the number of stages of the cascaded polyphase DFT-filter bank will increase its operating requirement. It will be clear to those skilled in the art how to select the number of stages that represent a cascaded polyphase DFT-filter bank with minimum operating requirements and when to terminate additional designs with increasing number of stages.

At step 1205-A, if K is less than $K_{max}$, then, at step 1205, the number, K, of stages for the cascaded polyphase DFT-filter bank is increased by one.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A method comprising:
    selecting a first number, $M_A$, of narrow-band channels each having a channel bandwidth, W, from an analog wide-band signal, said analog wide-band signal having a bandwidth, $W_{IF1}$, where $$M_A = \text{int}\left(\frac{W_{IF1}}{W}\right);$$

selecting a second number, $M_B$, of narrow-band channels, where $M_B \geq M_A$, wherein said second number, $M_B$, of narrow-band channels results in a decreased operating requirement for a cascaded polyphase DFT-filter bank relative to said first number, $M_A$, of narrow-band channels;
    receiving a second analog wide-band signal at a base station, said second analog wide-band signal defined by a bandwidth, $W_{IF2}$, where $W_{IF2} = M_B * W$; and
    converting said second analog wide-band signal into $M_B$ narrow-band channels.

2. The method of claim 1 wherein the step of selecting said $M_B$ narrow-band channels further comprises:
    factorizing said second number, $M_B$, into prime numbers; and
    selecting said $M_B$ narrow-band channels based on said prime numbers.

3. The method of claim 2 wherein said $M_B$ narrow-band channels are selected based on a value, $M_{TARGET}$, where said prime numbers are all less than or equal to said $M_{TARGET}$.

4. The method of claim 3 wherein said $M_{TARGET}$ is less than or equal to 7.

5. The method of claim 1 wherein the step of converting said second analog wide-band signal into said $M_B$ narrow-band channels further comprises:
    converting said second analog wide-band signal into a digital signal having a data rate, $R_p$;
    designing said cascaded polyphase DFT-filter bank having a number, K, of stages for converting said digital signal into $M_B$ narrow-band channels; and
    converting said digital signal into $M_B$ narrow-band channels at said K stages of said cascaded polyphase DFT-filter bank.

6. The method of claim 5 wherein the step of designing said cascaded polyphase DFT-filter bank for converting said digital signal into said $M_B$ narrow-band channels further comprises:
    defining a transform of a length, $L_i$, with a computational requirement of $f(L_i)$ for each of said stages for performing computations on said digital data;
    defining a number of branches for each said stage, where each said branch contains a FIR filter, $F_i$, of computational requirement, $f(F_i)$, for receiving said digital data; and
    minimizing a function, C, where $$C = \sum_{i=1}^{K}\left((f(F_i) + f(L_i)) * \frac{R_p}{L_i}\right).$$

7. The method of claim 6 further comprising:
    factorizing said length $L_i$ of said transform into a number, K', of prime factors, $P_j$; and
    minimizing said C function where $$f(L_i) = \prod_{i=1}^{K'}(2P_j - K_{Gi}),$$

and where $K_{Gi}$ is a number of factors in a Chinese Remainder Theorem for said computations.

8. The method of claim 7 wherein said transform is a Fast Fourier Transform when said $P_j$ prime factors are all equal to 2, and said transform is a Prime Factor Fast Fourier Transform when said $P_j$ prime factors are not all equal to 2.

9. A telecommunications system comprising:
    a controller operable to select a first number, $M_A$, of narrow-band channels each having a channel bandwidth, W, from an analog wide-band signal, said analog wide-band signal having a bandwidth, $W_{IF1}$, where $$M_A = \text{int}\left(\frac{W_{IF1}}{W}\right),$$

and said controller further operable for selecting a second number, $M_B$, of narrow-band channels, where $M_B \geq M_A$, and wherein said second number, $M_B$, of narrow-band channels results in a decreased operating requirement for a cascaded polyphase DFT-filter bank relative to said first number, $M_A$, of narrow-band channels;
    a receiver for receiving a second analog wide-band signal at a base station, said second analog wide-band signal defined by a bandwidth, $W_{IF2}$, where $W_{IF2} = M_B * W$;
    an RF-to-IF converter for changing frequency of said second analog wide-band signal;
    an analog-to-digital converter for converting said second analog wide-band signal to a digital signal; and
    said cascaded polyphase DFT-filter bank having a number, K, of stages for converting said digital signal into said $M_B$ narrow-band channels.

10. The telecommunications system of claim 9 wherein said controller is further operable
    to factorize said second number, $M_B$ into prime numbers and to select said $M_B$ narrow-band channels based on said prime numbers.

11. The telecommunications system of claim 10 wherein said controller selects said $M_B$ narrow-band channels based on a value, $M_{TARGET}$, where said prime numbers are all less than or equal to said $M_{TARGET}$.

12. The telecommunications system of claim 11 wherein said $M_{TARGET}$ is less than or equal to 7.

13. The telecommunications system of claim 9 wherein said analog-to-digital converter converts said second analog wide-band signal into said digital signal at a data rate, $R_p$.

14. The telecommunications system of claim 13 wherein said controller is further operable to:

define a transform of a length, $L_i$, with a computational requirement of $f(L_i)$ for each of said stages for performing computations on said digital data;

define a number of branches for each said stage, where each said branch contains a FIR filter, $F_i$, of computational requirement, $f(F_i)$, for receiving said digital data; and minimize a function, C, where $$C = \sum_{i=1}^{K} \left( (f(F_i) + f(L_i)) * \frac{R_p}{L_i} \right).$$

15. The telecommunications system of claim 14 wherein said controller is further operable to:

factorize said $L_i$ length of said transform into a number, K', of prime factors, $P_j$; and minimize said C function, where $$f(L_i) = \prod_{i=1}^{K'} (2P_j - K_{Gi}),$$

and where $K_{Gi}$, is a number of factors in a Chinese Remainder Theorem for said computations.

16. The telecommunications system of claim 15 wherein said transform is a Fast Fourier Transform when said $P_j$ prime factors are all equal to 2, and said transform is a Prime Factor Fast Fourier Transform when said $P_j$ prime factors are not all equal to 2.

17. A method comprising:

converting an analog wide-band signal into a digital signal having a data rate, $R_p$;

designing a cascaded polyphase DFT-filter bank having a number, K, of stages for converting said digital signal into a number, M, narrow-band channels by defining a transform of a length, $L_i$, with a computational requirement of $f(L_i)$ for each of said stages for performing computations on said digital data;

defining a number of branches for each said stage, where each said branch contains a FIR filter, $F_i$, of computational requirement, $f(F_i)$, for receiving said digital data;

minimizing a function, C, where $$C = \sum_{i=1}^{K} \left( (f(F_i) + f(L_i)) * \frac{R_p}{L_i} \right);$$

and converting said digital signal into M narrow-band channels at said K stages of said cascaded polyphase DFT-filter bank.

18. The method of claim 17 further comprising:

factorizing said $L_i$ length of said transform into a number, K', of prime factors, $P_j$; and minimizing said C function, where $$f(L_i) = \prod_{i=1}^{K'} (2P_j - K_{Gi}),$$

and where $K_{Gi}$ is a number of factors in a Chinese Remainder Theorem for said computations.

19. The method of claim 18 wherein said transform is a Fast Fourier Transform when said $P_j$ prime factors are all equal to 2, and said transform is a Prime Factor Fast Fourier Transform when said $P_j$ prime factors are not all equal to 2.

20. The method of claim 17 wherein said M narrow-band channels are selected based on a value, $M_{TARGET}$, where said prime numbers are all less than or equal to said $M_{TARGET}$.

21. The method of claim 20 wherein said $M_{TARGET}$ is less than or equal to 7.

22. A telecommunications system comprising:

an analog-to-digital converter operable for converting an analog wide-band signal into a digital signal having a data rate, $R_p$;

a cascaded polyphase DFT-filter bank having a number, K, of stages for converting said digital into a number, M, narrow-band channels; and a controller operable to design said polyphase filter by:

defining a transform of a length, $L_i$, with a computational requirement of $f(L_i)$ for each of said stages for performing computations on said digital data;

defining a number of branches for each said stage, where each said branch contains a FIR filter, $F_i$, of computational requirement, $f(F_i)$, for receiving said digital data;

minimizing a function, C, where $$C = \sum_{i=1}^{K} \left( (f(F_i) + f(L_i)) * \frac{R_p}{L_i} \right).$$

23. The telecommunications system of claim 22 wherein said controller is further operable to:

factorize said $L_i$ length of said transform into a number, K', of prime factors, $P_j$; and minimize said C function, where $$f(L_i) = \prod_{i=1}^{K'} (2P_j - K_{Gi}),$$

and where $K_{Gi}$ is a number of factors in a Chinese Remainder Theorem for said computations.

24. The telecommunications system of claim 23 wherein said transform is a Fast Fourier Transform when said $P_j$ prime factors are all equal to 2, and said transform is a Prime Factor Fast Fourier Transform when said $P_j$ prime factors are not all equal to 2.

25. The telecommunications system of claim 23 wherein said controller is further operable to select said M narrow-band channels based on a value, $M_{TARGET}$, where said prime numbers are all less than or equal to said $M_{TARGET}$.

26. The telecommunications system of claim 25 wherein said $M_{TARGET}$ is less than or equal to 7.

27. A method comprising:

selecting a first number, $M_A$, of narrow-band channels each having a channel bandwidth, W, for transmitting as an analog wide-band signal, said analog wide-band signal having a bandwidth, $W_{IF1}$, where $W_{IF1} \geq M_A * W$;

selecting a second number, $M_B$, of narrow-band channels, where $M_B \geq M_A$, and wherein said second number, $M_B$, of narrow-band channels results in a decreased operating requirement for a cascaded polyphase DFT-filter bank relative to said first number, $M_A$, of narrow-band channels;

converting said $M_B$ narrow-band channels into a second analog wide-band signal having a bandwidth, $W_{IF2}$, where $W_{IF2} = M_B * W$; and transmitting said second analog wide-band signal at a base station.

28. The method of claim 27 wherein the step of selecting said $M_B$ narrow-band channels further comprises:

factorizing said second number, $M_B$, into prime numbers; and selecting said $M_B$ narrow-band channels based on said prime numbers.

29. The method of claim 28 wherein said $M_B$ narrow-band channels are selected based on a value, $M_{TARGET}$, where said prime numbers are all less than or equal to said $M_{TARGET}$.

30. The method of claim 29 wherein said $M_{TARGET}$ is less than or equal to 7.

31. The method of claim 27 wherein the step of converting said $M_B$ narrow-band channels into said second analog wide-band signal further comprises:

converting said $M_B$ narrow-band channels into a digital signal having a data rate, $R_p$;

designing said cascaded polyphase DFT-filter bank having a number, K, of stages for converting said $M_B$ narrow-band channels into said digital signal; and converting said $M_B$ narrow-band channels into digital signal at said K stages of said cascaded polyphase DFT-filter bank.

32. The method of claim 31 wherein the step of designing further comprises:

defining a transform of a length, $L_i$, with a computational requirement of $f(L_i)$ for each of said stages for performing computations on said $M_B$ narrow-band channels;

defining a number of branches for each said stage, where each said branch contains a FIR filter, $F_i$, of computational requirement, $f(F_i)$, for receiving said $M_B$ narrow-band channels; and minimizing a function, C, where $$C = \sum_{i=1}^{K} \left( (f(F_i) + f(L_i)) * \frac{R_p}{L_i} \right).$$

33. The method of claim 32 further comprising:

factorizing said $L_i$ length of said transform into a number, K', of prime factors, $P_j$; and minimizing said C function, where $$f(L_i) = \prod_{i=1}^{K'} (2P_j - K_{Gi}),$$

and where $K_{Gi}$ is a number of factors in a Chinese Remainder Theorem for said computations.

34. The method of claim 33 wherein said transform is a Fast Fourier Transform when said $P_j$ prime factors are all equal to 2, and said transform is a Prime Factor Fast Fourier Transform when said $P_j$ prime factors are not all equal to 2.

35. A telecommunications system comprising:

a controller operable for selecting a first number, $M_A$, of narrow-band channels each having a channel bandwidth, W, for transmitting as an analog wide-band signal, said analog wide-band signal having a bandwidth, $W_{IF1}$, where $W_{IF1} \geq M_A * W$, and further operable to select a second number, $M_B$, of narrow-band channels, where $M_B \geq M_A$, and wherein said second number, $M_B$, of narrow-band channels results in a decreased operating requirement for a cascaded polyphase DFT-filter bank relative to said first number, $M_A$, of narrow-band channels;

a cascaded polyphase DFT-filter bank having a number, K, of stages for converting said $M_B$ narrow-band channels into a digital signal;

a digital-to-analog converter for converting said digital signal to an IF analog wide-band signal;

an IF-to-RF converter for converting said IF analog wide-band signal to a second analog wide-band signal having a bandwidth, $W_{IF2}$, where $W_{IF2} = M_B * W$; and a transmitter for transmitting said second analog wide-band signal at a base station.

36. The telecommunications system of claim 35 wherein said controller is further operable to:

factorize said second number, $M_B$, into prime numbers; and select said $M_B$ narrow-band channels based on said prime numbers.

37. The telecommunications system of claim 36 wherein said controller selects said $M_B$ narrow-band channels based on a value, $M_{TARGET}$, where said prime numbers are all less than or equal to said $M_{TARGET}$.

38. The telecommunications system of claim 37 wherein said $M_{TARGET}$ is less than or equal to 7.

39. The telecommunications system of claim 35 wherein said digital-to-analog converter converts said $M_B$ narrow-band channels into said digital signal at a data rate, $R_p$.

40. The telecommunications system of claim 39 wherein said controller is further operable to:

define a transform of a length, $L_i$, with a computational requirement of $f(L_i)$ for each of said stages for performing computations on said $M_B$ narrow-band channels;

define a number of branches for each said stage, where each said branch contains a FIR filter, $F_i$, of computational requirement, $f(F_i)$, for receiving said $M_B$ narrow-band channels; and minimize a function, C, where $$C = \sum_{i=1}^{K} \left( (f(F_i) + f(L_i)) * \frac{R_p}{L_i} \right).$$

41. The telecommunications system of claim 40 wherein said controller is further operable to:

factorize said $L_i$ length of said transform into a number, K', of prime factors, $P_j$; and minimize said C function, where $$f(L_i) = \prod_{i=1}^{K'} (2P_j - K_{Gi}),$$

and where $K_{Gi}$ is a number of factors in a Chinese Remainder Theorem for said computations.

42. The telecommunications system of claim 41 wherein said transform is a Fast Fourier Transform when said $P_j$ prime factors are all equal to 2, and said transform is a Prime Factor Fast Fourier Transform when said $P_j$ prime factors are not all equal to 2.

43. A method comprising:
designing a cascaded polyphase DFT-filter bank having a number, K, of stages for converting a number, M, narrow-band channels into digital signal having a data rate, $R_p$, by:
defining a transform of a length, $L_i$, with a computational requirement of $f(L_i)$
for each of said stages for performing computations on said M narrow-band channels;
defining a number of branches for each said stage, where each said branch contains a FIR filter, $F_i$, of computational requirement, $f(F_i)$, for receiving said M narrow-band channels; and
minimizing a function, C, where $$C = \sum_{i=1}^{K} \left( (f(F_i) + f(L_i)) * \frac{R_p}{L_i} \right);$$

converting said M narrow-band channels into said digital signal;
converting said digital signal into an analog wide-band signal; and
transmitting said analog wide-band signal.

44. The method of claim 43 further comprising:
factorizing said $L_i$ length of said transform into a number, K', of prime factors, $P_j$; and
minimizing said C function, where $$f(L_i) = \prod_{i=1}^{K'} (2P_j - K_{Gi}),$$

and where $K_{Gi}$ is a number of factors in a Chinese Remainder Theorem for said computations.

45. The method of claim 44 wherein said transform is a Fast Fourier Transform when said $P_j$ prime factors are all equal to 2, and said transform is a Prime Factor Fast Fourier Transform when said $P_j$ prime factors are not all equal to 2.

46. The method of claim 36 wherein said M narrow-band channels are selected based on a value, $M_{TARGET}$, where said prime numbers are all less than or equal to said $M_{TARGET}$.

47. The method of claim 42 wherein said $M_{TARGET}$ is less than or equal to 7.

48. A telecommunications system comprising:
a cascaded polyphase DFT-filter bank having a number, K, of stages for converting a number, M, narrow-band channels into digital signal having a data rate, $R_p$;
a controller operable for designing said polyphase filter by:
defining a transform of a length, $L_i$, with a computational requirement of $f(L_i)$ for each of said stages for performing computations on said M narrow-band channels;
defining a number of branches for each said stage, where each said branch contains a FIR filter, $F_i$, of computational requirement, $f(F_i)$, for receiving said M narrow-band channels;
minimizing a function, C, where $$C = \sum_{i=1}^{K} \left( (f(F_i) + f(L_i)) * \frac{R_p}{L_i} \right);$$

a digital-to-analog converter for converting said digital signal into an analog wide-band IF signal;
an IF-to-RF converter for converting said analog wide-band IF signal into an analog wide-band RF signal and
a transmitter for transmitting said analog wide-band RF signal.

49. The telecommunications system of claim 48 wherein said controller is further operable to:
factorize said $L_i$ length of said transform into a number, K', of prime factors, $P_j$;
to minimize said C function, where $$f(L_i) = \prod_{i=1}^{K'} (2P_j - K_{Gi}),$$

and where $K_{Gi}$ is a number of factors in a Chinese Remainder Theorem for said computations.

50. The telecommunications system of method of claim 49 wherein said transform is a Fast Fourier Transform when said $P_j$ prime factors are all equal to 2, and said transform is a Prime Factor Fast Fourier Transform when said $P_j$ prime factors are not all equal to 2.

51. The telecommunications system of claim 48 wherein said controller is further operable to select said M narrow-band channels based on a value, $M_{TARGET}$, where said prime numbers are all less than or equal to said $M_{TARGET}$.

52. The method of claim 51 wherein said $M_{TARGET}$ is less than or equal to 7.

* * * * *